United States Patent
Kawatani et al.

(10) Patent No.: US 7,029,217 B2
(45) Date of Patent: Apr. 18, 2006

(54) FASTENING STRUCTURE INCLUDING A BOLT HAVING A SERRATION THAT IS PRESS-FIT INTO A BOLTHOLE OF A FLANGE

(75) Inventors: Teruyuki Kawatani, Kashiwara (JP); Yasuhiro Miyata, Yamatokooriyama (JP); Nobuyuki Seo, Yamatokooriyama (JP); Tomohiro Ishii, Yamatotakada (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/606,736

(22) Filed: Jun. 27, 2003

(65) Prior Publication Data

US 2004/0001744 A1  Jan. 1, 2004

Related U.S. Application Data

(60) Division of application No. 10/359,092, filed on Feb. 6, 2003, now Pat. No. 6,612,794, which is a division of application No. 09/716,220, filed on Nov. 21, 2000, now Pat. No. 6,537,007, which is a continuation of application No. 09/287,185, filed on Apr. 6, 1999, now Pat. No. 6,174,117.

(30) Foreign Application Priority Data

Apr. 7, 1998 (JP) ................................. 10-094411

(51) Int. Cl.
*F16B 21/18* (2006.01)
(52) U.S. Cl. ...................................... 411/107; 411/180
(58) Field of Classification Search ............... 411/107, 411/180
See application file for complete search history.

(56) References Cited

U.S. PATENT DOCUMENTS

| 1,996,128 A | 4/1935 | Thomson |
| 2,056,688 A | 10/1936 | Peterka et al. |
| 2,544,304 A | 3/1951 | Eckenbeck et al. |
| 2,548,840 A | 4/1951 | Eksergian |
| 3,461,936 A | 8/1969 | Rosan, Sr. et al. |
| 3,480,306 A | 11/1969 | Hsu |
| 3,630,253 A | 12/1971 | Sherman |
| 3,699,637 A | 10/1972 | Rosiek |

(Continued)

FOREIGN PATENT DOCUMENTS

GB  1 490 514  11/1997

(Continued)

*Primary Examiner*—Suzanne Dino Barrett
(74) *Attorney, Agent, or Firm*—Wenderoth, Lind & Ponack, L.L.P.

(57) ABSTRACT

A fastening structure capable of preventing deterioration in the flatness of a surface of a flange portion (2) when a serration (7) of a bolt (5) is press-fit into the flange portion (2). In this fastening structure, one portion in an axial direction of an outer peripheral surface (6) of the bolt (5) is provided with the serration (7). The bolt (5) is press-fit into a bolthole (3) formed through the flange portion (2) of a mounting member (1). The serration (7) is located apart from respective end surfaces (2A) and (2B) of the flange portion (2) by first and second distances (D, C), and the first and second distances (D, C) each exceed 13% of the thickness (A) of the flange portion (2). With this arrangement, the serration (7) presses a bolthole inner peripheral surface (13) only in the region located far apart from both of the end surfaces (2A and 2B) of the flange portion (2).

4 Claims, 3 Drawing Sheets

U.S. PATENT DOCUMENTS

| | | |
|---|---|---|
| 4,396,309 A | 8/1983 | McCormick |
| 4,577,402 A | 3/1986 | Swanstrom |
| 4,827,756 A | 5/1989 | Crigger |
| 4,975,007 A | 12/1990 | Molina |
| 5,266,258 A | 11/1993 | Martin |
| 6,174,117 B1 | 1/2001 | Kawatani et al. |
| 6,190,102 B1 | 2/2001 | Vignotto et al. |
| 6,537,007 B1 | 3/2003 | Kawatani et al. |
| 6,612,794 B1 * | 9/2003 | Kawatani et al. ........... 411/107 |

FOREIGN PATENT DOCUMENTS

| | | |
|---|---|---|
| JP | 56-139602 | 3/1955 |
| JP | 56-73602 | 6/1981 |
| JP | 56-73603 | 6/1981 |
| JP | 60-38918 | 3/1985 |
| JP | 1-148901 | 10/1989 |
| JP | 1-285453 | 11/1989 |
| JP | 2-217604 | 8/1990 |
| JP | 5-50177 | 7/1993 |
| JP | 7-164809 | 6/1995 |
| JP | 10-89333 | 4/1998 |
| JP | 11-257325 | 9/1999 |
| JP | 11-294425 | 10/1999 |
| JP | 2000-65104 | 3/2000 |

* cited by examiner

FASTENING STRUCTURE INCLUDING A BOLT HAVING A SERRATION THAT IS PRESS-FIT INTO A BOLTHOLE OF A FLANGE

This is a divisional application of Ser. No. 10/359,092, filed Feb. 6, 2003, now U.S. Pat. No. 6,612,794 which is a divisional application of Ser. No. 09/716,220, filed Nov. 21, 2000, now U.S. Pat. No. 6,537,007, which is a continuation of Ser. No. 09/287,185, filed Apr. 6, 1999, now U.S. Pat. No. 6,174,117.

BACKGROUND OF THE INVENTION

The present invention relates to a fastening structure for fastening a bolt to a flange by press-fitting a serration of the bolt into a bolthole of the flange.

There has conventionally been a mechanism as shown in FIG. 4, which adopts this kind of fastening structure. This structure is a structure for fastening a brake disk 103 and a wheel member 110 to a flange 102 of an inner ring member 105 by means of a bolt 101 and a nut 111.

According to this fastening structure, the bolt 101 is fixed to the flange 102 by press-fitting a serration 106 formed on the bolt 101 into a bolthole 107 of the flange 102. Then, the brake disk 103 and the wheel member 110 are fitted around this bolt 101 and fastened by means of the nut 111.

However, in the aforementioned conventional fastening structure, as shown in FIG. 3, an inner peripheral surface 107A of the bolthole 107 of the flange 102 is pressed by the serration 106 when the bolt 101 is press-fit into the flange 102, so that the flange 102 is elastically deformed. Due to this elastic deformation, a flange surface 102A on the bolt head side is deformed into a convex shape, while a flange surface 102B on the opposite side is deformed into a concave shape.

As described above, if the flatness of the flange surfaces 102A and 102B are deteriorated, then the brake disk 103 cannot be mounted parallel to the flange surface 102B. This leads to the problem that one-sided abutment of the brake disk 103 is caused, generating vibrations and abnormal noises.

SUMMARY OF THE INVENTION

Accordingly, the object of the present invention is to provide a fastening structure capable of preventing the deterioration in flatness of the flange surface when the serration of the bolt is press-fit into the flange.

In order to achieve the aforementioned object, the present invention provides a fastening structure including a bolt whose one portion in an axial direction of an outer peripheral surface is provided with a serration is press-fit into a bolthole formed in a flange portion of a mounting member.

A first distance between one axial end portion of the serration and one end surface of the flange portion exceeds 13% of a thickness in the axial direction of the flange portion, and a second distance between the other axial end portion of the serration and the other end surface of the flange portion exceeds 13% of the thickness in the axial direction of the flange portion.

According to the fastening structure of the present invention, the serration is located apart from the respective end surfaces of the flange portion by the first and second distances, and the first and second distances each exceed 13% of the thickness of the flange portion. With this arrangement, when the bolt is press-fit into the flange portion, the serration presses the bolthole inner peripheral surface only in a region far from both the end surfaces of the flange portion (in a region deeper than 13% of the thickness). In the regions close to the respective end surfaces of the flange portion (in each region shallower than 13% of the thickness), the serration does not press the bolthole inner peripheral surface.

By thus limiting the region where the serration of the bolt presses the bolthole inner peripheral surface to the region located far apart from both the end surfaces of the flange portion, the flange surface can be prevented from deteriorating in flatness when the serration is press-fit into the flange.

In an embodiment, a center portion in the axial direction of the serration substantially coincides with a center portion in the axial direction of thickness of the flange portion.

In this embodiment, the center portion in the axial direction of the serration is made to substantially coincide with the center portion in the direction of thickness of the flange portion. With this arrangement, the dimension in the axial direction of the serration can be maximized with the flatness of the flange surface maintained, thereby allowing its slip torque to be maximized.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described in detail below on the basis of the embodiment thereof with reference to the drawings.

Figure 1:
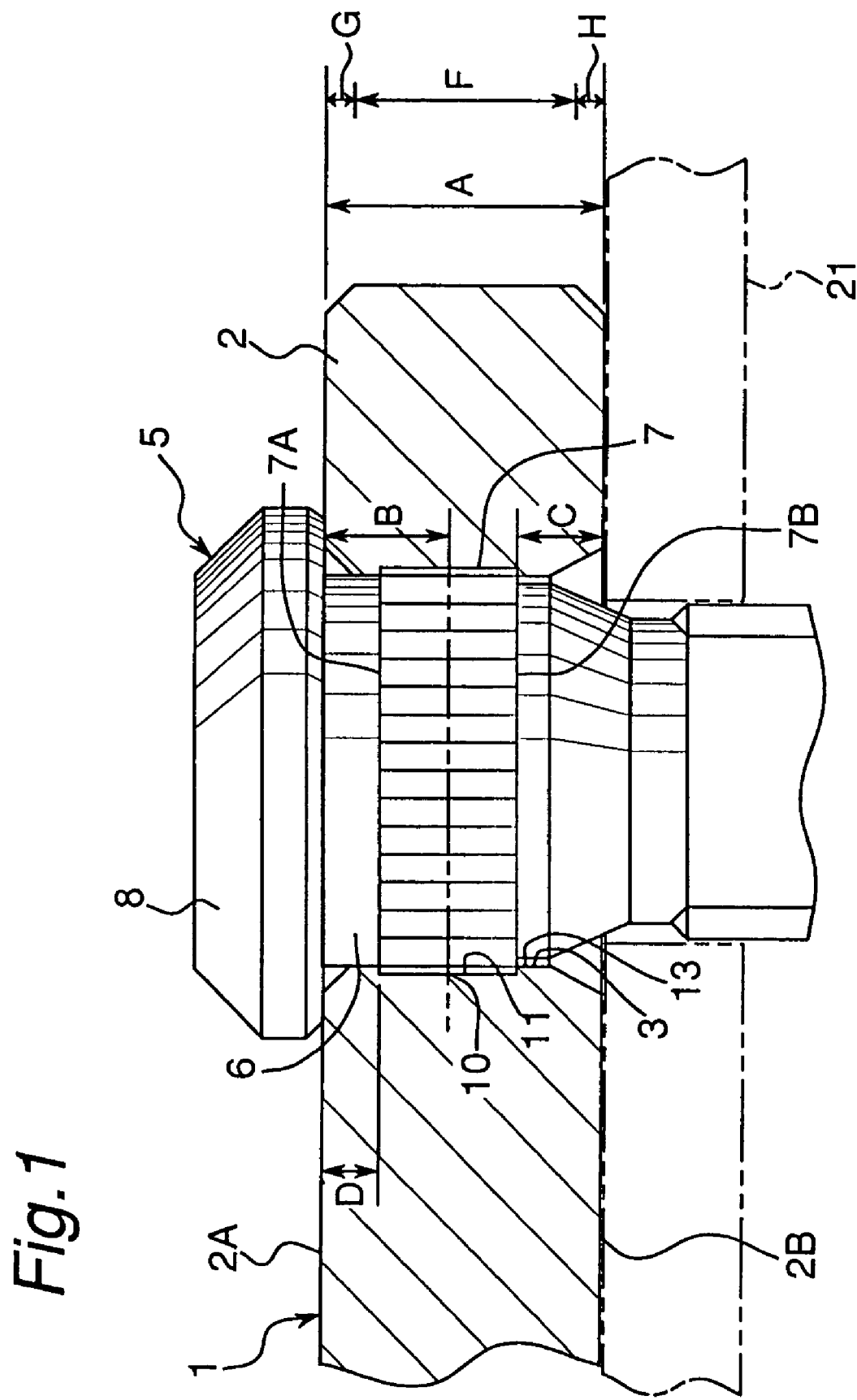
FIG. 1 is a sectional view showing an embodiment of a fastening structure of the present invention.

FIG. 1 shows an embodiment of the fastening structure of the present invention. In this embodiment, a bolt 5 is press-fit into a bolthole 3 formed in a metal flange portion 2 of a mounting member 1. A serration 7 is formed on a portion of the bolt in an axial direction of an outer peripheral surface 6 of the bolt 5.

A first distance D between one axial end portion 7A of this serration 7 and an end surface 2A on a bolt head 8 side of the flange portion 2 occupies 18% of the thickness A in the axial direction of the flange portion 2. A second distance C between the other axial end portion 7B of this serration 7 and the other end surface 2B of the flange portion 2 occupies 30% of the above thickness A.

Then, the center portion 10 in the axial direction of this serration 7 is made to substantially coincide with the center portion 11 in the direction of thickness of the flange portion 2.

According to the fastening structure of the above construction, the serration 7 is located apart from both the end surfaces 2A and 2B of the flange portion 2 by the first and second distances D and C, and the first and second distances D and C each exceed 13% of the thickness A of the flange portion 2. With this arrangement, when the bolt 5 is press-fit into the flange portion 2, the serration 7 presses the bolthole inner peripheral surface 13 only in a region located far from both the end surfaces 2A and 2B of the flange portion 2 (in the region F deeper than 13% of the thickness A). In the regions close to both the end surfaces 2A and 2B of the flange portion 2 (in the regions G and H shallower than 13% of the thickness), the serration 7 does not press the bolthole inner peripheral surface 13.

As described above, by limiting the region where the serration 7 of the bolt 5 presses the bolthole inner peripheral surface 13 to the region located far apart from both the end surfaces 2A and 2B of the flange portion 2, the flange surfaces 2A and 2B can be prevented from deteriorating in flatness when the serration 7 is press-fit into the flange portion 2. Therefore, for example, a brake disk 21 or the like can be mounted on the flat flange surface 2B, so that the one-sided abutment of the brake disk 21 or the like can be prevented, and so that the generation of vibrations and abnormal noises can be prevented.

The above effects will be described on the basis of a concrete experimental example. According to this experimental example, a plurality of fastening structure samples in each of which a ratio (%) of the second distance C with respect to the thickness A of the flange portion 2 was set to a specified value within a range of 0% to 30% were subjected to the measurement of flange flatness. The measurement result is shown in FIG. 2B. As shown in FIG. 2B, when (C/A)×100% becomes equal to or smaller than 13%, the flatness of the flange surface 2B abruptly deteriorates. In the region where (C/A)×100% ranges beyond 13% to 30%, the flatness of the flange surface 2B is satisfactory and kept at an approximately constant value. As described above, by positioning the axial end portion 7B of the serration 7 apart from the flange surface 2B by a dimension of 13% or more of the thickness A, the flatness of the flange surface 2B is made satisfactory, thereby allowing the brake disk, 21 or the like to be mounted on this flat flange surface 2B. Therefore, the one-sided abutment of the brake disk or the like can be prevented, and the generation of vibrations and abnormal noises can be prevented.

Figure 2A:
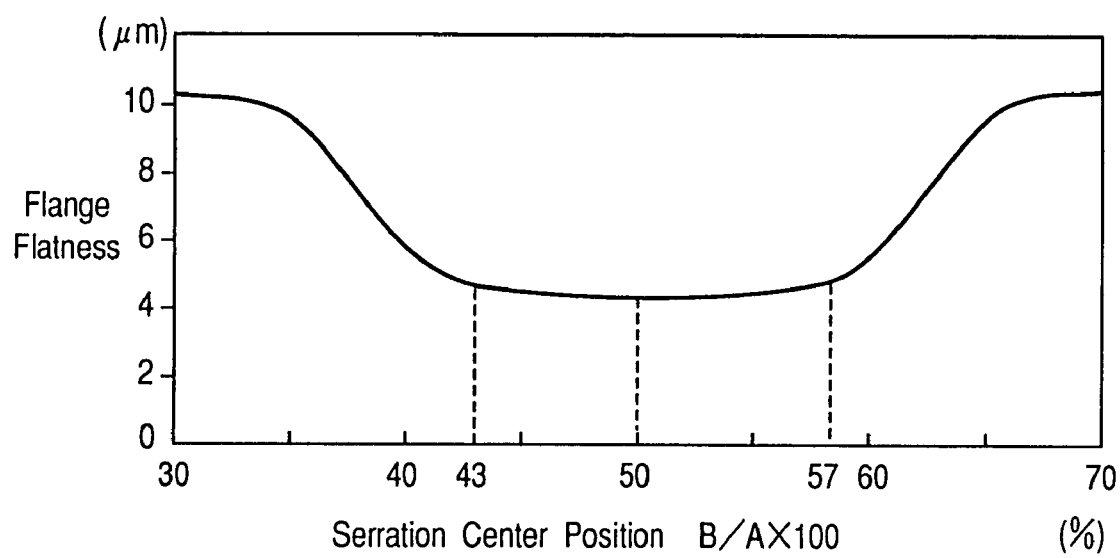
FIG. 2A is a graph of a characteristic showing a variation in flange flatness when the serration center position is changed in the above embodiment.
Figure 2B:
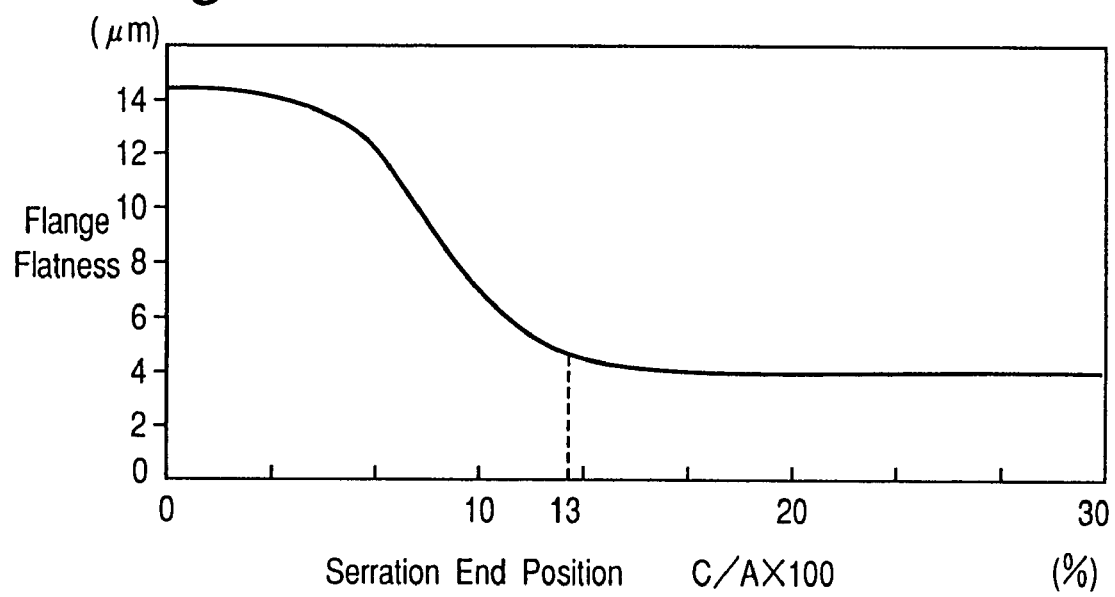
FIG. 2B is a graph of a characteristic showing a variation in flange flatness when the serration end position is changed in the above embodiment.
Figure 3:
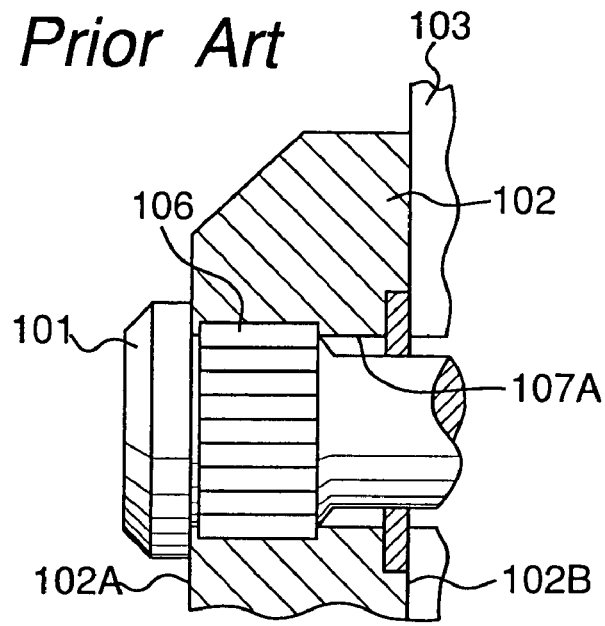
FIG. 3 is a sectional view showing a conventional fastening structure.
Figure 4:
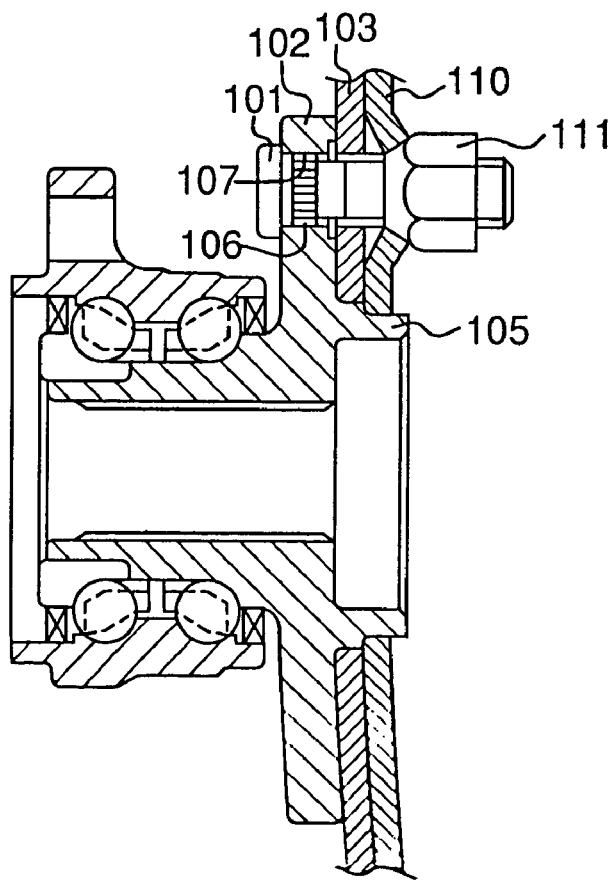
FIG. 4 is a sectional view of an automobile wheel bearing having the conventional fastening structure.

FIG. 2A shows the measurement result of the flange flatness of a plurality of fastening structure samples in each of which a ratio (%) of a distance B between the center portion 10 of the serration 7 with respect to the thickness A of the flange portion 2 is set to a specified value within a range of 30% to 70%. As shown in FIG. 2A, the flange flatness was the best when (B/A)×100% was 50%, and the flange flatness exhibited an approximately constant satisfactory value within the range in which (B/A)×100% ranges from 43% to 57%. In the case where (B/A)×100% was smaller than 43% or greater than 57%, the flange flatness deteriorated abruptly, as a result.

In this embodiment, the center portion 10 in the axial direction of the serration 7 was made to substantially coincide with the center portion 11 in the direction of thickness of the flange portion 2. Therefore, the first and second distances D and C between the respective end portions 7A and 7B of the serration 7 and the respective end surfaces 2A and 2B of the flange portion 2 can be made approximately equal to each other, and accordingly, satisfactory flange flatness can be achieved. As compared with a case where the center portion 10 is displaced from the center portion 11, a serration having a great dimension in the axial direction can be arranged in the deep region F, so that the slip torque can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastening structure comprising:
   a bolt having a bolt head, a larger outer diameter portion extending in an axial direction of the bolt, and a smaller outer diameter portion extending in the axial direction of the bolt and provided with a thread portion; and
   a mounting member having a flange portion in which a bolthole is formed and to which a brake disk is fixed by the bolt passing through the bolthole of the flange portion and a hole of the brake disk, an abutting surface of the bolt head abutting on a seat surface of the flange portion of the mounting member,
   wherein an outer peripheral surface of the larger outer diameter portion of the bolt is provided with an engaging portion engaging with the bolthole of the flange portion,
   wherein a length of the engaging portion is shorter in an axial direction of the bolt than a thickness of the flange portion, and
   wherein a center portion in the axial direction of the engaging portion coincides with a center portion in the axial direction of the flange portion.

2. A fastening structure as claimed in claim 1, wherein a length in the axial direction of the engaging portion of the bolt does not exceed 74% of a thickness in the axial direction of the flange portion.

3. A device for a wheel, said device comprising:
   a bolt having a bolt head, a larger outer diameter portion extending in an axial direction of the bolt, and a smaller outer diameter portion extending in the axial direction of the bolt and provided with a thread portion;
   an inner ring member having a flange portion in which a bolthole is formed and to which a brake disk is fixed by the bolt passing through the bolthole of the flange portion and a hole of the brake disk, an abutting surface of the bolt head abutting on a seat surface of the flange portion of the inner ring member;
   an outer ring; and
   a plurality of rolling elements disposed between the inner ring member and the outer ring,
   wherein an outer peripheral surface of the larger outer diameter portion of the bolt is provided with an engaging portion engaging with the bolthole of the flange portion,
   wherein a length of the engaging portion is shorter in an axial direction of the bolt than a thickness of the flange portion, and
   wherein a center portion in the axial direction of the engaging portion coincides with a center portion in the axial direction of the flange portion.

4. A device for a wheel as claimed in claim 3, wherein a length in the axial direction of the engaging portion of the bolt does not exceed 74% of a thickness in the axial direction of the flange portion.

* * * * *